United States Patent
Bilde et al.

(10) Patent No.: US 9,867,336 B2
(45) Date of Patent: Jan. 16, 2018

(54) COMBINE HARVESTER GRAIN CLEANING SYSTEM

(71) Applicant: AGCO A/S, Hesston, KS (US)

(72) Inventors: Morten Leth Bilde, Langaa (DK); Magnus Baltzer Kristensen, Randers (DK)

(73) Assignee: AGCO A/S, Randers (DK)

( * ) Notice: Subject to any disclaimer, the term of this patent is extended or adjusted under 35 U.S.C. 154(b) by 0 days.

(21) Appl. No.: 15/106,225

(22) PCT Filed: Dec. 5, 2014

(86) PCT No.: PCT/EP2014/076776
§ 371 (c)(1),
(2) Date: Jun. 17, 2016

(87) PCT Pub. No.: WO2015/091034
PCT Pub. Date: Jun. 25, 2015

(65) Prior Publication Data
US 2016/0309657 A1    Oct. 27, 2016

(30) Foreign Application Priority Data

Dec. 18, 2013 (GB) .................................. 1322403.5

(51) Int. Cl.
*A01F 7/06* (2006.01)
*B02B 3/06* (2006.01)
(Continued)

(52) U.S. Cl.
CPC ................ *A01F 12/46* (2013.01); *A01F 7/06* (2013.01); *A01F 12/39* (2013.01); *A01F 12/44* (2013.01); *A01F 12/444* (2013.01); *A01F 12/446* (2013.01)

(58) Field of Classification Search
CPC .......... A01F 12/44; A01F 7/067; A01F 12/00; A01F 12/18; A01F 12/446; A01D 41/1276; A01D 75/282
(Continued)

(56) References Cited

U.S. PATENT DOCUMENTS 1,852,361 A * 4/1932 Naffziger ................ A01F 12/44
                                                        209/416
2,303,249 A    11/1942 Ashton et al.
(Continued)

FOREIGN PATENT DOCUMENTS

DE    EP 3150058 A1 * 4/2017 ............. A01F 12/30
EP        0144291 A2    6/1985
(Continued)

OTHER PUBLICATIONS

UK Intellectual Property Office, International Search Report for Priority UK Application No. GB1322403.5, dated Jun. 12, 2014.
(Continued)

*Primary Examiner* — Arpad Fabian-Kovacs

(57) ABSTRACT

A combine harvester including threshing and separating apparatus which are arranged to process a cut crop stream and each having a grate arrangement through which material separated from the crop stream falls under gravity. Grain conveyance means arranged below the threshing and separating apparatus catch the falling grain and material other than grain (MOG). A stratification pan is located below a front region of the threshing and separating apparatus and a return conveyor is located below a rear region of the threshing and separating apparatus, both conveyors being driven in a oscillating manner. The return conveyor conveys said grain and MOG in a forward direction to a front edge thereof which is located above the stratification pan. The stratification pan conveys collected material rearwardly to a rear edge from where the collected material falls under
(Continued)

gravity into a cleaning unit. An accelerator roller is provided and is rotatably driven on a transverse axis in front of the front edge of the return conveyor. Material caught by the return conveyor is incident upon the accelerator roller and paddles provided on the accelerator roller serve to accelerate the material from the return conveyor forwardly.

5 Claims, 4 Drawing Sheets

(51) Int. Cl.
    *A01F 12/46*         (2006.01)
    *A01F 12/44*         (2006.01)
    *A01F 12/39*         (2006.01)

(58) Field of Classification Search
    USPC .......................................................... 460/69
    See application file for complete search history.

(56) References Cited

U.S. PATENT DOCUMENTS

| | | | | |
|---|---|---|---|---|
| 3,593,719 | A * | 7/1971 | Ashton | A01F 12/44 460/73 |
| 4,378,024 | A * | 3/1983 | De Busscher | A01F 12/442 460/73 |
| 5,769,712 | A * | 6/1998 | Honas | A01F 12/442 460/114 |
| 6,494,782 | B1 * | 12/2002 | Strong | A01D 41/1271 460/71 |
| 6,932,697 | B2 * | 8/2005 | Baumgarten | A01D 41/1276 460/1 |
| 9,462,752 | B2 * | 10/2016 | Farley | A01F 12/446 |
| 2002/0037758 | A1 * | 3/2002 | Visagie | A01F 12/444 460/99 |
| 2002/0086722 | A1 * | 7/2002 | Kuhn | A01D 41/1243 460/100 |
| 2003/0199291 | A1 * | 10/2003 | Bernhardt | A01D 41/1273 460/4 |
| 2007/0056258 | A1 * | 3/2007 | Behnke | A01D 41/127 56/10.2 R |
| 2007/0062288 | A1 * | 3/2007 | Behnke | A01D 41/1273 73/587 |
| 2007/0256403 | A1 * | 11/2007 | Teroerde | A01D 41/1243 460/100 |
| 2009/0299568 | A1 * | 12/2009 | Schlingmann | G05B 19/042 701/33.4 |
| 2010/0217481 | A1 * | 8/2010 | Baumgarten | A01D 41/127 701/33.4 |
| 2011/0223979 | A1 * | 9/2011 | Bussmann | A01F 7/067 460/80 |
| 2012/0322521 | A1 * | 12/2012 | Baumgarten | A01D 75/282 460/69 |
| 2014/0019017 | A1 * | 1/2014 | Wilken | A01D 41/127 701/50 |
| 2014/0342787 | A1 * | 11/2014 | Roberg | A01F 12/30 460/83 |
| 2014/0364179 | A1 * | 12/2014 | Brinkmann | A01D 41/1243 460/112 |
| 2016/0007536 | A1 * | 1/2016 | Bussmann | A01D 41/12 460/83 |

FOREIGN PATENT DOCUMENTS

| | | |
|---|---|---|
| EP | 0186630 A1 | 7/1986 |
| EP | 0799562 A1 | 10/1997 |
| FR | 1564176 A | 4/1969 |
| FR | 2651088 A1 | 3/1991 |

OTHER PUBLICATIONS

European Patent Office, International Search Report for International Patent Application No. PCT/EP2014/076776, dated Mar. 25, 2015.

* cited by examiner

COMBINE HARVESTER GRAIN CLEANING SYSTEM

FIELD OF INVENTION

The invention relates to the processing of a crop stream in a combine harvester and more particularly to the means to convey material separated from the crop stream to a grain cleaning unit.

BACKGROUND

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the straw, and cleans the grain before storing in an on-board tank. Straw and crop residue is ejected from the rear of the machine.

WO-2012/095239 discloses a combine harvester having threshing and separating apparatus arranged to convey a cut crop stream in a generally rearward direction. A threshing cylinder rotating on a transverse axis conveys the crop stream tangentially underneath. Grain dislodged from the crop stream falls through a concave grate onto an underlying oscillating pan, hereinafter termed a stratification pan.

The remaining crop stream is conveyed to the separating apparatus which, in this case, comprises a pair of axial separating rotors. Grain and material other than grain (MOG) falls through a grate arrangement disposed under the rotors onto an oscillating return pan which conveys the grain and MOG forwardly to a front edge from where it falls onto the stratification pan.

The grain and MOG collected by the stratification pan is conveyed rearwardly by the oscillating motion, in combination with a ridged pattern on the pan, to a rear edge from where it falls into a cleaning unit having a plurality of sieves and the like.

The return pan of WO-2012/095239 overlaps the stratification pan so that the grain and MOG conveyed by the former falls onto the latter. The stratification pan stratifies the different materials, namely the chaff, straw and grain, as they are conveyed rearwardly before falling into the cleaning unit. Stratification of the grain and chaff allows a reduced cleaning airflow thus minimising grain loss. Furthermore, the reduced entropy of the grain/chaff mix allows the grain to settle more rapidly on the chaffer of the cleaning unit.

Testing of the construction disclosed by WO-2012/095239 reveals significant improvement in the capacity of the cleaning unit. However, efforts continue to improve the stratification of materials on the stratification pan upstream of the cleaning unit.

SUMMARY OF INVENTION

In accordance with the invention there is provided a combine harvester comprising threshing and separating apparatus arranged to convey in a generally rearward direction, and process, a cut crop stream and comprising a grate arrangement through which material separated from the crop stream falls under gravity onto grain conveyance means arranged below the threshing and separating apparatus, the grain conveyance means comprising a stratification pan located below a front region of the threshing and separating apparatus and a return conveyor located below a rear region of the threshing and separating apparatus, the return conveyor positioned to catch material falling through the grate above and driven to convey said material in a forward direction to a front edge thereof which is located above the stratification pan, the stratification pan being driven in an oscillating manner to convey collected material rearwardly to a rear edge from where the collected material falls under gravity into a cleaning unit, wherein an accelerator roller is provided and is rotatably driven on a transverse axis proximate to the front edge of the return conveyor, wherein material caught by the return conveyor is incident upon the accelerator roller, and wherein paddles provided on the accelerator roller serve to accelerate the material from the return conveyor forwardly.

It should be understood that positional terms such as 'front', 'rear', 'forward' and 'backward' are made with reference to the forward direction of travel of the combine harvester wherein a cutterbar is typically located at the front and the crop residue is ejected at the rear.

The accelerator roller projects the grain and MOG from the return pan forwardly towards the front of the stratification pan. Advantageously, the grain is more dense than the MOG and is thus projected further. The MOG is more affected by air resistance and is not projected as far as the grain. The result is improved stratification of the grain and MOG wherein a larger proportion of the grain settles onto the lower layers whilst the MOG comes to rest on top.

The return conveyor preferably comprises a return pan driven in an oscillating manner. Alternatively, the return pan may comprise an endless belt wrapped around a pair of rollers and having a front edge in close proximity to the accelerator roller. The rotation axis of the accelerator roller is preferably disposed in front of the front edge of the return conveyor. In the case of an oscillating return pan being provided, the swept envelope of the accelerator roller and paddles may extend above the height of the return pan. This is because the aggressiveness of the oscillating motion may throw the grain and MOG upwardly to an extend as it reaches the front edge thereof.

The accelerator roller is preferably driven so that the top circumferential edge moves forwardly so as to project the material from the return pan forwardly rather than downwardly.

The front edge of the return conveyor is preferably located above the stratification pan so that the material on the return conveyor is carried forward before being ejected onto the roller.

In a preferred embodiment the grain conveyance means comprises a second return conveyor located in front of the first return conveyor and disposed under a front portion of the threshing and separating apparatus and arranged to catch a portion of said material separated from the crop stream and convey the caught material forwardly to a respective front edge from where the material falls under gravity onto the stratification pan. By providing two return conveyors the grain is collected from the threshing and separating apparatus in two separate streams, each being dropped onto the stratification pan in two separate places.

It is recognised that the material discharged from the front region of threshing and separating apparatus is richer in grain than that falling through a rear region. In striving for improved stratification of the crop material on the stratification pan, the first, forward-most, return conveyor advantageously drops this grain-rich mix near to the front of the stratification pan thus maximising the stratification that takes place upstream of the cleaning unit.

The remainder of the material falling from the rear region of the separating apparatus is more rich in MOG and is collected by the second return conveyor and dropped at a position behind that of the first grain-rich portion. In effect, the more MOG-rich, or dirtier, material is dropped onto the cleaner grain-rich material already stratified on the pan. Advantageously, the dual return conveyor thus improves stratification of the collected grain and MOG.

The invention lends itself to any known processing system including conventional, hybrid and axial systems.

BRIEF DESCRIPTION OF DRAWINGS

Further advantages of the invention will become apparent from reading the following description of specific embodiments with reference to the appended drawings in which.

DETAILED DESCRIPTION OF EMBODIMENTS

Figure 1:
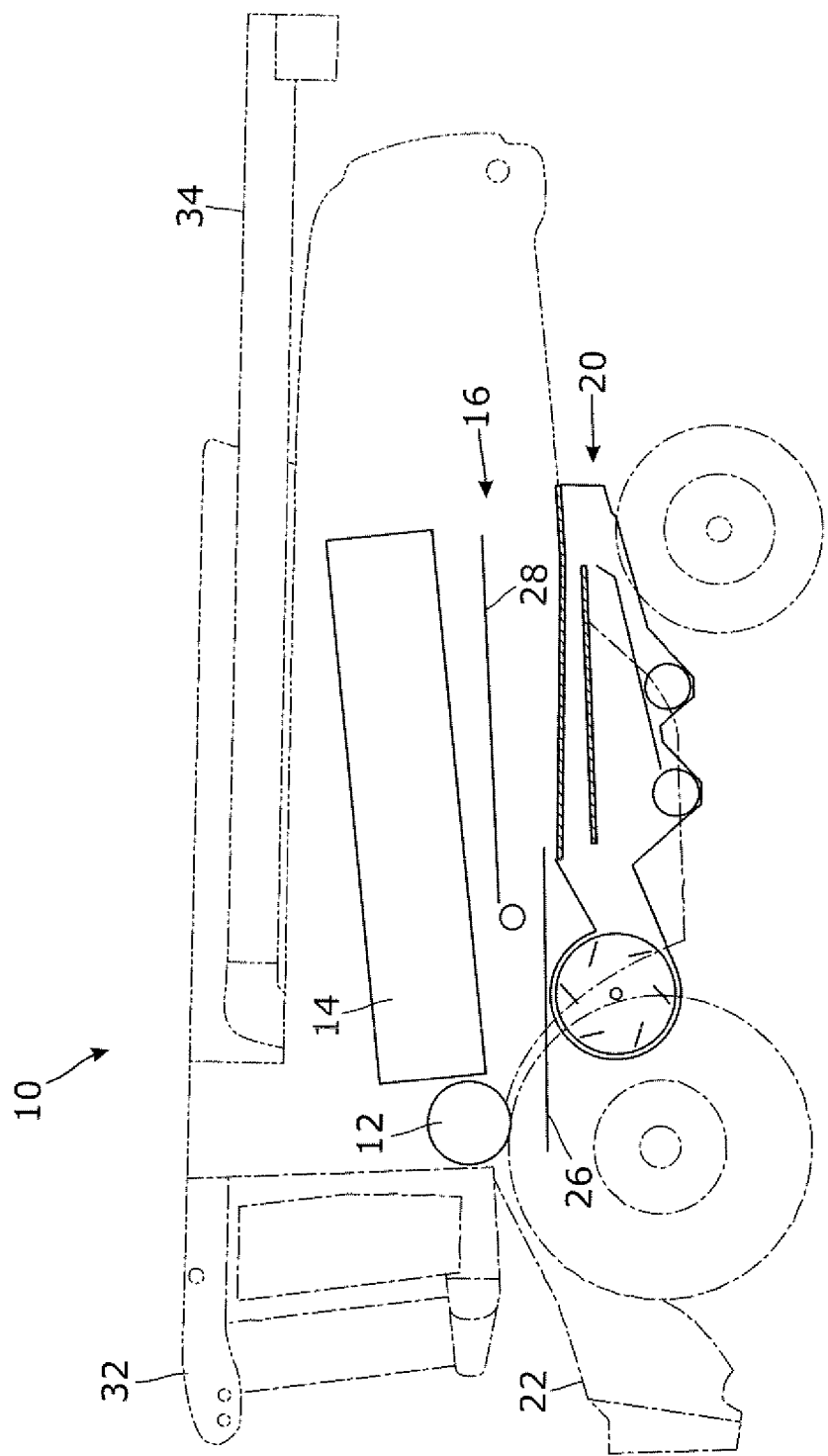
FIG. 1 is a schematic side elevation view of a combine harvester according to a first embodiment of the invention and showing the outline of the combine harvester in ghost form.

With reference to FIG. 1 a combine harvester 10 is shown in ghost form whilst the threshing apparatus 12, separating apparatus 14, conveyance pans 16 and grain cleaning unit 20 embodied therein are shown with solid lines.

Combine 10 includes a front elevator housing 22 at the front of the machine for attachment of a header (not shown). The header when attached serves to cut and collect the crop material as it progresses across the field, the collected crop stream being conveyed up through the elevator housing 22 into threshing apparatus which is represented schematically at 12. The threshing apparatus comprises a cylinder including a rotating drum and a concave-shaped grate below (not shown). The cylinder includes rasp bars (not shown) which act upon the crop stream to thresh the grain or seeds from the remaining material, the majority of the threshed grain passing through the underlying grate and onto a stratification pan 26.

In an alternative embodiment, the transverse threshing cylinder may be replaced by a feed beater which carries out minimal threshing action and instead serves to feed the crop material tangentially underneath to axial rotors which carry out both a threshing and separating function. In yet another embodiment, the transverse cylinder may be omitted so that the crop stream is fed directly from the elevator 22 into a front end of one or more axial rotors.

Turning back to FIG. 1, the remainder of the crop material including straw, tailings and unthreshed grain are passed from the threshing unit 12 into separating apparatus represented at 14. The separating apparatus 24 may include a plurality of parallel, longitudinally-aligned, straw walkers (straw-walker combine). Alternatively, the separating apparatus 24 may include one or two longitudinally-aligned rotors which rotate on an longitudinal axis and convey the crop stream rearwardly in a ribbon passing along a spiral path (axial or hybrid combine). In both cases the separating apparatus serve to separate further grain from the crop stream which passes through a grate-like structure onto an underlying return pan 28. The residue crop material, predominantly made up of straw, exits the machine at the rear 30. Although not shown in FIG. 1, a straw spreader and/or chopper may be provided to process the straw material as required.

For completeness, the combine 10 includes a driver's cab 32 and an unloading auger 34, shown in the transport position in FIG. 1.

The threshing and separating apparatus do not remove all MOG from the grain and the crop stream collected by the stratification pan 26 and return pan 28 typically includes a proportion of straw, chaff, tailings and other unwanted material such as weed seeds, bugs, and tree twigs. A grain cleaning unit is provided to remove this unwanted material thus leaving a clean sample of grain to be delivered to the tank.

For clarity, the term 'grain cleaning apparatus' used hereinafter is intended to include the stratification pan 26, the return pan 28 and the cleaning unit 20 comprising the fan unit, chaffer and sieve(s).

Figure 2:
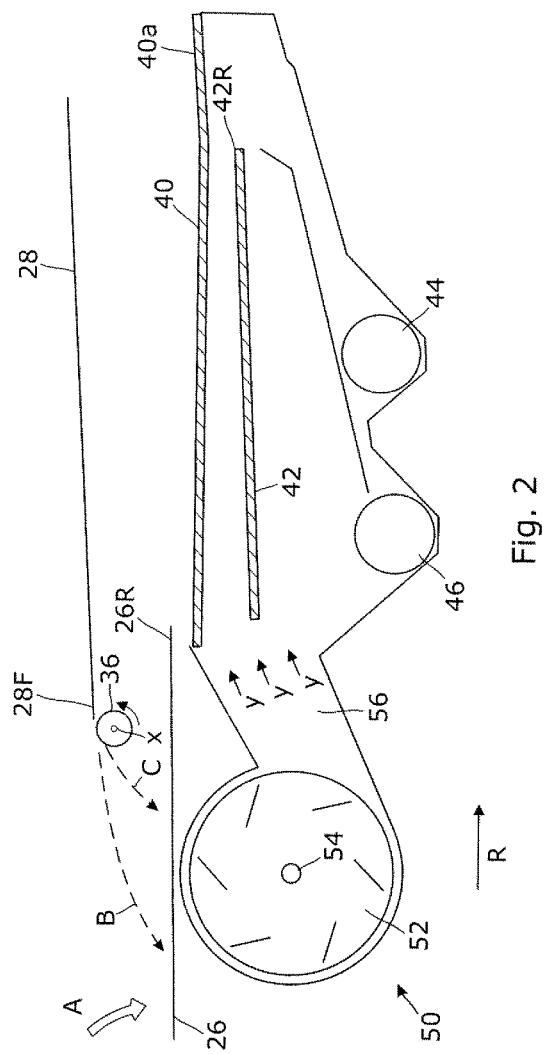
FIG. 2 is a schematic vertical section through the combine harvester of FIG. 1 showing the conveyance pans and grain cleaning unit.
Figure 3:
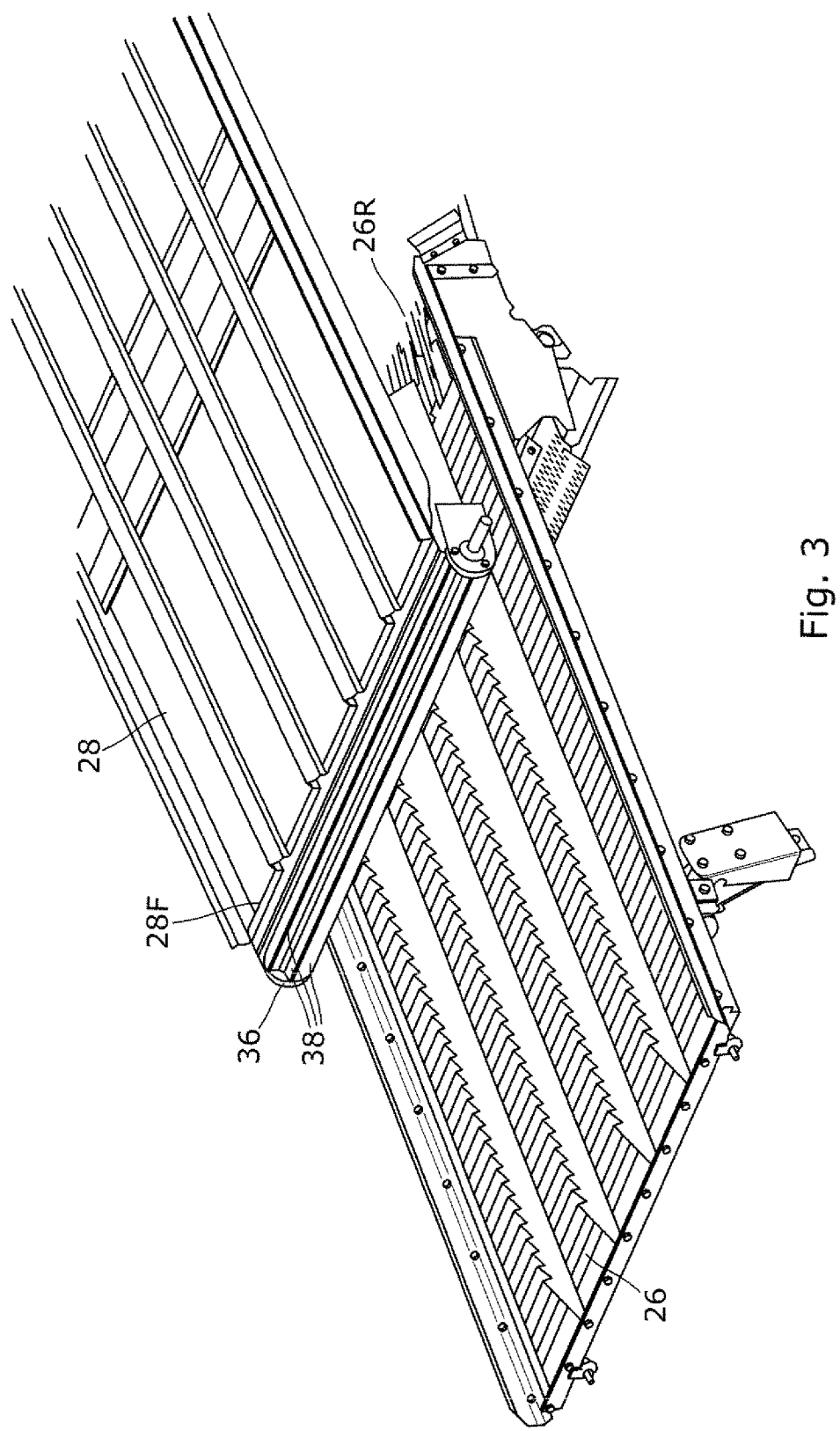
FIG. 3 is a raised front perspective view of the grain conveyance pans of the combine of FIG. 1.

Turning to the detail of the grain cleaning apparatus, shown in FIGS. 2 and 3, the stratification pan 26 and return pan 28 are driven in an oscillating manner as in known machines to convey the grain and MOG accordingly. Although the drive and mounting mechanisms for the stratification pan 26 and return pan 28 are not shown, it should be appreciated that this aspect is well known in the art of combine harvesters and is not critical to disclosure of the invention. Furthermore, it should be appreciated that the two pans 26, 28 may take a ridged construction as is know in the art and also appreciate that FIG. 2 shows the grain cleaning apparatus in simplistic form.

As mentioned above, grain passing through concave grate of threshing cylinder 12 falls onto the front of stratification pan 26 indicated by arrow A in FIG. 2. This material is conveyed rearwardly (in the direction of arrow R in FIG. 2) by the oscillating motion of the stratification pan 26 and the ridged construction thereof. Material passing through the grate of separator apparatus 14 falls onto the return pan 28 and is conveyed forwardly by the oscillating motion and ridged construction thereof.

When the material reaches the front edge 28F of return pan 28 it falls onto an accelerator roller 36 which rotates on a transverse axis X disposed in front and below the front edge. The direction of rotation is such that the front edge of the roller 36 moves forwardly at the top (anticlockwise as viewed in FIG. 2). It should be understood that the roller, or at least the swept envelope of the roller 36, may extend above the height of the return pan front edge 28F depending on the aggressiveness of the oscillating motion.

Roller 36 comprises a sheet metal core and a plurality of paddles 38 which extend along the width of the roller and which corresponds closely to the width of the return pan 28. As the grain and MOG fall onto the roller 36, the paddles 38 propel the material forwardly before it falls onto the stratification pan 26 and on top of the material conveyed from the threshing unit 12.

The grain is more dense than the MOG and is thus projected further as represented by arrow B. The MOG is more affected by air resistance and is not projected as far as the grain as represented by arrow C. The result is improved stratification of the grain and MOG wherein a larger proportion of the grain settles onto the lower layers whilst the MOG comes to rest on top.

This conveyance and combination of two crop streams upstream of the cleaning unit 20 is disclosed in WO-2012/095239 to which reference is invited.

The oscillating motion of stratification pan 26 conveys the combined crop streams rearwardly towards the rear edge 26R of stratification pan 26. Whilst conveyed across the stratification pan 26 the grain and MOG undergoes stratification wherein the heavier grain sinks to the bottom layers adjacent stratification pan 26 and the lighter/larger MOG rises to the top layers.

The additional forward propulsion or acceleration of the grain and MOG falling from the return pan 28 created by the roller 36 generates a natural separation of the material above the stratification pan dependent upon the aerodynamics of the different materials. The result is that a larger proportion of the grain settles onto the surface of the stratification pan 26 whilst the MOG, not reaching the front region thereof, comes to rest on top of the grain-rich layer.

Upon reaching the rear edge 26R, the stratified crop stream falls onto a chaffer 40 which is also driven in a fore-and-aft oscillating motion. The chaffer 40 is of a known construction and includes a series of transverse ribs or louvers which create open channels or gaps therebetween. The chaffer ribs are angled upwardly and rearwardly so as to encourage MOG rearwardly whilst allowing the heavier grain to pass through the chaffer onto an underlying sieve 42.

Chaffer 40 includes an inclined rear extension section 40*a*. MOG which reaches the rear section 40*a* either passes over the rear edge and out of the machine or through the associated grate before being conveyed to a returns auger 44 for rethreshing in a known manner. It should be appreciated that the majority of materials passing through the extension section 40*a* is, and is intended to be, unthreshed tailings. The construction of the ribs/louvers are the same for both parts of the chaffer 40, 40*a* but the two sections can be adjusted individually with respect to the clearance between the louvers. In many conditions one will adjust the chaffer extension 40*a* to have a bigger clearance than the chaffer 40 to catch more of the grains bouncing along the chaffer.

Grain passing through chaffer 40 is incident on sieve 42 which is also driven in an oscillating manner and serves to remove tailings from the stream of grain before being conveyed to on-board tank (not shown) by grain collecting auger 46 which resides in a transverse trough 42 at the bottom of the cleaning unit 12. Tailings 'blocked' by sieve 42 are conveyed rearwardly by the oscillating motion thereof to a rear edge 42R from where the tailings are directed to the returns auger 44 for reprocessing in a known manner.

The grain cleaning apparatus further comprises a fan unit 50 for generating a cleaning air stream which is directed through the falling grain/MOG stream as it falls from edge 26R, and through the sieve 36 and chaffer 34. The fan unit 50 includes a fan 52 which rotates on a transverse axis 54 in a known manner. The fan 52 includes a plurality of impellor blades which draw in air from the transverse ends open to the environment and generate an air stream directed through channel 56 in a generally rearward direction. The air stream (designated generally by arrows Y) creates a pressure differential across the chaffer 40 and sieve 42 to encourage lighter MOG rearwardly and upwardly whilst allowing the grain to pass through the chaffer 40 and the sieve 42. Although not shown in FIG. 2, it should be appreciated that the air stream Y also passes above chaffer 40 and below stratification pan 26 thus acting upon the crop stream as it falls from the rear edge 26R of the stratification pan 26.

Figure 4:
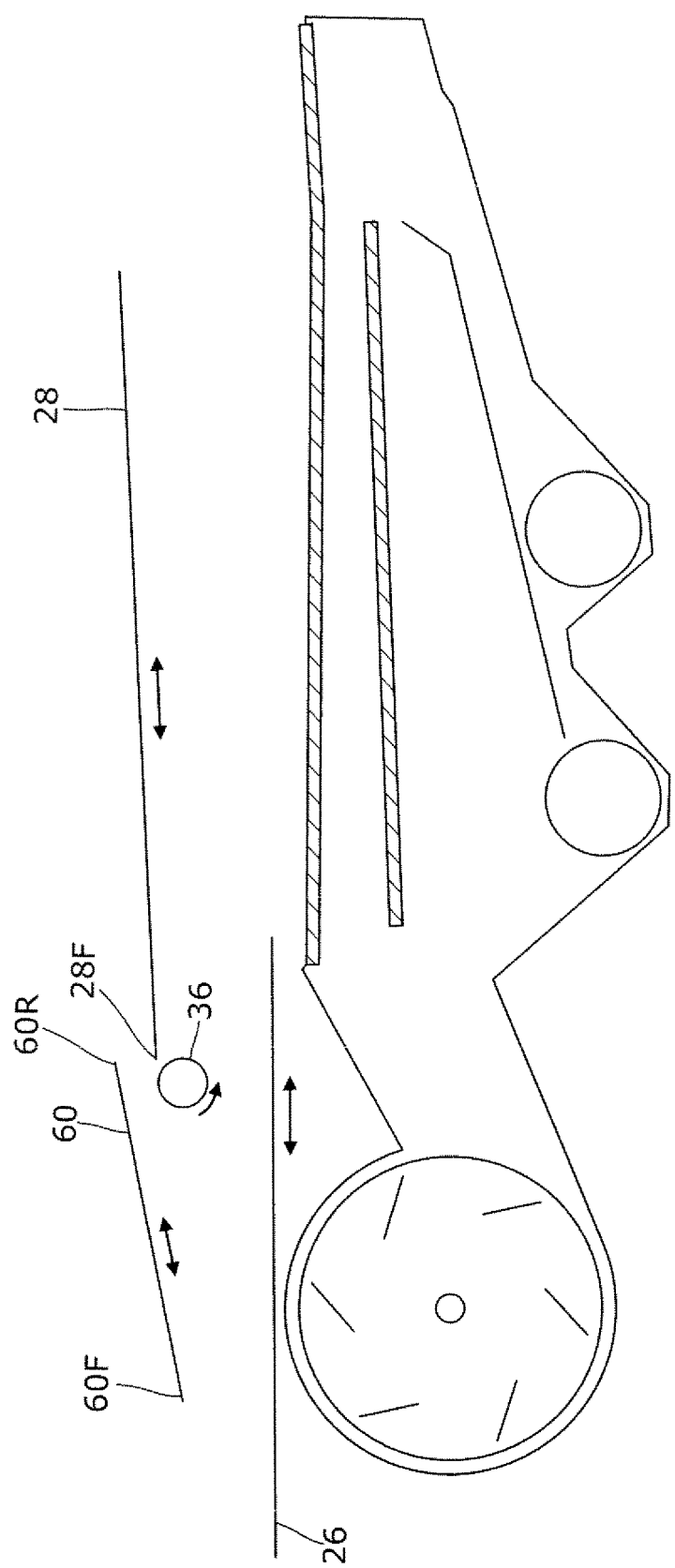
FIG. 4 is a schematic vertical section through a combine harvester according to a second embodiment of the invention and showing the conveyance pans and grain cleaning unit.

FIG. 4 shows an alternative embodiment of the invention which includes an additional return pan 60 located in front of the aforementioned return pan 28, termed 'rear return pan' 28 hereinafter. Likewise, the same reference numerals will be used for components which are the same as those described in relation to FIGS. 1-3 above.

Grain and MOG falling from the threshing and separating apparatus 12,14 is caught by one of the two return pans 60,28 mounted underneath. The front return pan 60 extends across the discharge width of threshing and separating apparatus 12,14 and is positioned to catch material from a front region of the threshing and separating apparatus 12,14.

The second, rear, return pan 28 is located behind the front return pan 60 and is configured to catch the remainder of the grain and MOG that falls from the separating apparatus 28. As such, the rear return pan 28 is significantly longer than the front return pan 60. The front edge 28F of the rear return pan 28 is substantially vertically aligned with the rear edge 60R of the front return pan 60 so that the vast proportion of the material falling from the separating apparatus is caught by one of the two return pans.

Both return pans 60, 28 slope downwardly in the direction of material flow and are driven in an oscillating manner as per conventional return pans in combines today. Collected material is thus conveyed in a generally forward direction (toward the front of the combine 10) and deposited from the respective front edges 60F, 28F.

As with the above-described embodiment, grain and MOG falling from the front edge 28F of rear return pan 28 is engaged by the top side of accelerator roller 36 with the aforementioned effects.

In summary a combine harvester comprises threshing and separating apparatus which are arranged to process a cut crop stream and each comprising a grate arrangement through which material separated from the crop stream falls under gravity. Grain conveyance means arranged below the threshing and separating apparatus catch the falling grain and material other than grain (MOG). A stratification pan is located below a front region of the threshing and separating apparatus and a return conveyor is located below a rear region of the threshing and separating apparatus, both conveyors being driven in a oscillating manner. The return conveyor conveys said grain and MOG in a forward direction to a front edge thereof which is located above the stratification pan. The stratification pan conveys collected material rearwardly to a rear edge from where the collected material falls under gravity into a cleaning unit. An accelerator roller is provided and is rotatably driven on a transverse axis in front of the front edge of the return conveyor. Material caught by the return conveyor is incident upon the accelerator roller, and paddles provided on the accelerator roller serve to accelerate the material from the return conveyor forwardly.

The invention claimed is:

1. A combine harvester comprising:
   threshing and separating apparatus arranged to convey in a generally rearward direction and process a cut crop stream, the threshing and separating apparatus comprising a grate arrangement through which material separated from the crop stream falls under gravity;
   a grain conveyance assembly arranged below the threshing and separating apparatus, the grain conveyance assembly comprising:
      a stratification pan located below a front region of the threshing and separating apparatus;
      a return conveyor located below a rear region of the threshing and separating apparatus, the return conveyor positioned to catch material falling through the grate above and driven to convey said material in a forward direction to a front edge thereof which is located above the stratification pan, the stratification pan being driven in an oscillating manner to convey collected material rearwardly to a rear edge from where the collected material falls under gravity into a cleaning unit; and an accelerator roller rotatably driven on a transverse axis proximate to the front edge of the return conveyor so that a top circumferal edge of the accelerator roller moves forwardly, wherein material caught by the return conveyor is incident upon the top side of the accelerator roller, and wherein paddles provided on the accelerator roller serve to accelerate the material from the return conveyor forwardly.

2. The combine harvester according to claim 1, wherein the return conveyor comprises a return pan driven in an oscillating manner.

3. The combine harvester according to claim 1, wherein the front edge of the return conveyor is located above the stratification pan.

4. A combine harvester comprising:
threshing and separating apparatus arranged to convey in a generally rearward direction and process a cut crop stream, the threshing and separating apparatus comprising a grate arrangement through which material separated from the crop stream falls under gravity; and
a grain conveyance assembly arranged below the threshing and separating apparatus, the grain conveyance assembly comprising:
a stratification pan located below a front region of the threshing and separating apparatus;
a return conveyor located below a rear region of the threshing and separating apparatus, the return conveyor positioned to catch material falling through the grate above and driven to convey said material in a forward direction to a front edge thereof which is located above the stratification pan, the stratification pan being driven in an oscillating manner to convey collected material rearwardly to a rear edge from where the collected material falls under gravity into a cleaning unit; and
an accelerator roller rotatably driven on a transverse axis proximate to the front edge of the return conveyor, wherein material caught by the return conveyor is incident upon the top side of the accelerator roller, and wherein paddles provided on the accelerator roller serve to accelerate the material from the return conveyor forwardly; and
a second return conveyor located in front of the first return conveyor and disposed under the front region of the threshing and separating apparatus and arranged to catch a portion of said material separated from the crop stream and convey the caught material forwardly to a respective front edge from where the material falls under gravity onto the stratification pan.

5. The combine harvester according to claim 1, wherein the threshing and separating apparatus further comprises a pair of longitudinally-aligned axial rotors arranged in a side-by-side relationship.

* * * * *